United States Patent
Banse et al.

(10) Patent No.: US 10,807,158 B2
(45) Date of Patent: Oct. 20, 2020

(54) BEARING BLOCK FOR HOLDING A BEARING FOR A ROLLER

(71) Applicant: SMS GROUP GMBH, Düsseldorf (DE)

(72) Inventors: Robert Banse, Neuss (DE); Markus Reifferscheid, Korschenbroich (DE)

(73) Assignee: SMS GROUP GMBH, Düsseldorf (DE)

( * ) Notice: Subject to any disclaimer, the term of this patent is extended or adjusted under 35 U.S.C. 154(b) by 333 days.

(21) Appl. No.: 16/060,469

(22) PCT Filed: Dec. 12, 2016

(86) PCT No.: PCT/EP2016/080702
§ 371 (c)(1),
(2) Date: Jun. 8, 2018

(87) PCT Pub. No.: WO2017/098057
PCT Pub. Date: Jun. 15, 2017

(65) Prior Publication Data
US 2020/0269311 A1 Aug. 27, 2020

(30) Foreign Application Priority Data
Dec. 11, 2015 (DE) .................. 10 2015 225 024

(51) Int. Cl.
*F16C 13/02* (2006.01)
*F16C 19/38* (2006.01)
(Continued)

(52) U.S. Cl.
CPC .......... *B22D 11/1287* (2013.01); *F16C 13/02* (2013.01); *F16C 19/38* (2013.01);
(Continued)

(58) Field of Classification Search
CPC ........ F16C 13/02; F16C 19/38; F16C 19/525; F16C 23/086; F16C 35/042; F16C 39/06;
(Continued)

(56) References Cited

U.S. PATENT DOCUMENTS 4,492,551 A * 1/1985 Hegler ................ B29C 49/4823
425/144
4,944,609 A 7/1990 Salter
(Continued)

FOREIGN PATENT DOCUMENTS

DE  2347892 A1  4/1975
DE  19843990 C1 *  8/1999  ............. H05B 6/145
(Continued)

*Primary Examiner* — Marcus Charles
(74) *Attorney, Agent, or Firm* — Lucas & Mercanti, LLP; Klaus P. Stoffel

(57) ABSTRACT

A bearing block for holding a bearing for a roller, in particular a strand-guiding roller in a strandguiding device. The bearing block is designed as a solid casting having an integrated internal coolant channel. The coolant channel has an inlet and an outlet for coolant. In order to enable an improvement in the product quality of the cast slabs, the bearing block has a rotational speed sensor for sensing the rotational speed of the roller.

11 Claims, 3 Drawing Sheets

(51) Int. Cl.
  *F16C 23/08* (2006.01)
  *F16C 35/04* (2006.01)
  *F16C 37/00* (2006.01)
  *B22D 11/128* (2006.01)
  *F16C 19/52* (2006.01)

(52) U.S. Cl.
  CPC .......... *F16C 19/525* (2013.01); *F16C 23/086* (2013.01); *F16C 35/042* (2013.01); *F16C 37/007* (2013.01); *F16C 2204/60* (2013.01); *F16C 2233/00* (2013.01)

(58) Field of Classification Search
  CPC .. F16C 43/045; F16C 37/007; F16C 2233/00; F16C 2204/40; F16C 2204/60
  USPC ......... 384/448.467, 476–477, 493, 564–565, 384/905, 912
  See application file for complete search history.

(56) References Cited

U.S. PATENT DOCUMENTS

| | | | |
|---|---|---|---|
| 6,508,128 | B2 | 1/2003 | Bode |
| 8,216,117 | B2 | 7/2012 | Brotzki et al. |
| 8,267,154 | B2 | 9/2012 | Springmann et al. |
| 8,808,610 | B2 * | 8/2014 | Scharf ..................... B29C 33/04 264/505 |
| 9,260,186 | B1 * | 2/2016 | van der Westhuizen .................... B64C 27/605 |
| 9,573,190 | B2 | 2/2017 | Poeppl et al. |
| 2011/0158571 | A1 | 6/2011 | Furusawa |
| 2012/0068460 | A1 * | 3/2012 | Wadehn .................. F03D 80/70 290/44 |
| 2013/0129270 | A1 | 5/2013 | Takahashi |
| 2014/0348453 | A1 * | 11/2014 | Bartl ..................... H02J 50/001 384/476 |
| 2015/0030052 | A1 * | 1/2015 | Martinetti .............. G01K 13/08 374/179 |
| 2015/0211572 | A1 * | 7/2015 | Casazza .................... F03D 7/00 290/44 |
| 2016/0076586 | A1 * | 3/2016 | Campbell ............. F16C 19/386 384/448 |

FOREIGN PATENT DOCUMENTS

| | | | | |
|---|---|---|---|---|
| DE | 10019324 | C1 | 7/2001 | |
| DE | 19944652 | A1 | 5/2002 | |
| DE | 102008046540 | A1 | 3/2010 | |
| DE | 102009039259 | A1 | 3/2011 | |
| DE | 102009054165 | A1 | 5/2011 | |
| DE | 102013224626 | A1 | 4/2015 | |
| EP | 215310 | A * | 3/1987 | .............. F16C 13/02 |
| EP | 1147829 | B1 | 10/2001 | |
| EP | 1585609 | B1 | 7/2006 | |
| EP | 2334454 | B1 | 11/2015 | |
| FR | 2647182 | A1 * | 11/1990 | .............. F16C 19/52 |
| GB | 2529193 | A * | 2/2016 | ............ F16C 19/525 |
| JP | 2000102849 | A | 4/2000 | |
| JP | 2007085890 | A | 4/2007 | |
| JP | 2009269040 | A1 | 3/2011 | |
| KR | 20140126970 | A * | 11/2014 | ............ G01M 13/04 |
| WO | 2011026957 | A1 | 3/2011 | |
| WO | 2011065882 | A1 | 6/2011 | |
| WO | 2014048685 | A2 | 4/2014 | |

* cited by examiner

BEARING BLOCK FOR HOLDING A BEARING FOR A ROLLER

CROSS-REFERENCE TO RELATED APPLICATIONS

The present application is a 371 of International application PCT/EP2016/080702, filed Dec. 12, 2016, which claims priority of DE 10 2015 225 024.5, filed Dec. 11, 2015, the priority of these applications is hereby claimed and these applications are incorporated herein by reference.

BACKGROUND OF THE INVENTION

The invention pertains to a bearing block for holding a bearing for a roller, in particular a strand-guiding roller in a strand-guiding device of a strand-casting machine. The invention also pertains to a strand-casting device with at least one corresponding bearing block.

PRIOR ART

In strand-casting machines for casting slabs, rotationally supported rollers are used, which have the job of guiding the cast metal strand after it has left the mold along a defined path; these rollers also cool and support the strand. The rollers are supported by their necks by means of bearings in bearing blocks and, to carry away heat, they are cooled by feeding a coolant (especially water) under pressure to the interior of the roller and of the bearing block, this feed being realized through rotary unions, for example.

The support and/or guidance of the metal strand can, depending on the casting format and position, be accomplished on all sides of the strand, from opposite sides of the strand, or only from the bottom surface of the strand. Accordingly, the rollers are used in various arrangements, such as roller rings, offset double rollers, multiply supported longitudinal rollers, or single rollers.

The rollers, especially the roller jackets, the bearing blocks, and the bearings, are exposed to extreme thermal loads as a result of direct/indirect contact with the glowing metal strand and above all as a result of radiant heat. This is true in particular for the rollers in the turning zone. To this must be added the effects of the aggressive environment caused by water contaminated with casting powder residues and also by steam, scale, etc.

In many cases, it is necessary for the rollers to be close together and thus to have small diameters in order that the strand can be supported effectively, which additionally increases the stress on the rollers. The sizes of the bearings therefore also become smaller.

Narrow gaps between adjacent strands and other components of the casting machine such as cooling elements, steel structures, foundations, or pipelines demand that the roller guides be designed to be as compact as possible. Nevertheless, the rollers which are used and their arrangement must also be extremely reliable, have a long service life, and require only modest maintenance.

Bearings which meet these stringent requirements are known in principle from the prior art, e.g., from DE 23 47 892 or WO 2011/065882 A1. These two documents each disclose bearing blocks manufactured as solid castings of martensitic steel. Each has an integrated cooling channel for a coolant with an inlet and an outlet.

Although these bearing blocks are already easy to maintain simply because they are manufactured as solid castings, they nevertheless suffer from the disadvantage that neither their cooling action nor their support function is monitored.

JP 2009269040 A discloses the monitoring of the rotational speed of a strand guide roller.

US 2011/0158571 A1 discloses a sealed rolling bearing.

SUMMARY OF THE INVENTION

The invention is based on the goal of elaborating a known bearing block in such a way that the product quality of the cast slabs can be improved.

The claimed detection of the rotational speed makes it possible to monitor the rotational functionality of the bearing. This is especially important with respect to the improvement of product quality, because stationary rollers will cause striations to be formed on the cast slabs as they are guided along the strand-guiding system. The formation of so-called "black stones", i.e., scale deposits, is thus also avoided, which would otherwise damage the produced slabs during the further course of processing.

In addition to the provision of a rotational speed sensor, it is also advantageous to provide at least one temperature sensor to detect the temperature of the coolant in the coolant channel.

The provision of this temperature sensor makes it possible advantageously to monitor the functionality and thus the overall support function of the rollers. In particular, the claimed temperature measurement makes it possible to achieve automatic control of the quantity of coolant being supplied to the bearing block and thus to optimize coolant consumption.

According to an exemplary embodiment, two temperature sensors are provided, each of which is configured as a thermocouple. A first thermocouple is provided in the inlet of the coolant channel to detect the coolant inlet temperature there. A second thermocouple is provided in the outlet of the coolant channel to detect the coolant outlet temperature there. The detection of the inlet temperature and outlet temperature of the coolant makes possible an especially precise monitoring of the action of the cooling system and thus, in association with that, an optimal automatic control of the coolant feed and/or coolant consumption.

According to a first exemplary embodiment, the rotational speed sensors can be designed as Hall sensors cooperating with magnets on the roller neck. The rotational speed sensor is preferably mounted in a blind hole introduced into the bearing from the outside.

The thermocouples are preferably configured as screw-in thermocouples, one of which is screwed into a bore in the inlet, the other into a bore in the outlet of the coolant channel.

In the coolant channel there are preferably several stabilizing ribs. These are required for technical manufacturing reasons, when the bearing block, as claimed, is designed as a solid casting. In addition, they have the job of supporting and stabilizing the coolant channel.

The goal of the invention described above is also achieved by a strand-guiding device of a strand-casting machine, wherein at least one neck of one of the strand-guiding rollers of the strand-guiding device is supported in a bearing block according to the invention. The advantages of this solution correspond to the advantages cited above in reference to the claimed bearing block.

BRIEF DESCRIPTION OF THE DRAWING

Four figures are attached to the description, wherein.

DETAILED DESCRIPTION OF THE INVENTION

The invention is described in detail below in the form of exemplary embodiments with reference to the cited figures. In all the figures, technical elements which are the same are designated by the same reference numbers.

Figure 1:
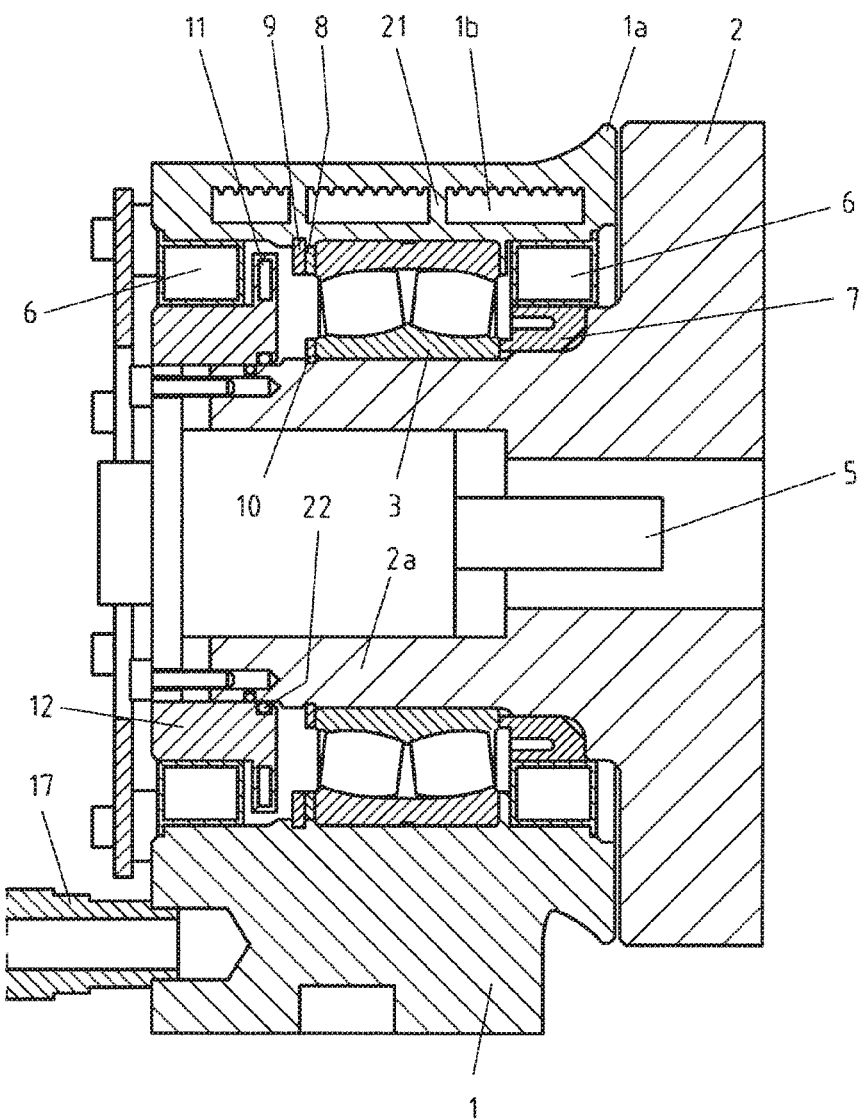
FIG. 1 shows a first vertical section through the bearing block according to the invention along a longitudinal axis of a supported roller.

FIG. 1 shows the bearing block 1 according to the invention as a longitudinal section along the longitudinal axis of the roller 2 to be supported. The bearing block 1 according to the invention comprises a dirt hump 1a and an integrated coolant channel 1b. The coolant channel 1b is divided here by way of example into three subchannels by two stabilizing ribs 21. The bearing block serves to hold a bearing, in particular a roller bearing 3. The roller bearing 3 serves in turn to hold and support the bearing neck 2a of the roller 2; see also FIG. 2. Reference number 5 designates a rotary union; 6 designates a cartridge seal; 7 and 8 designate spacer rings; and 9 and 10 designate locking rings.

Figure 4:
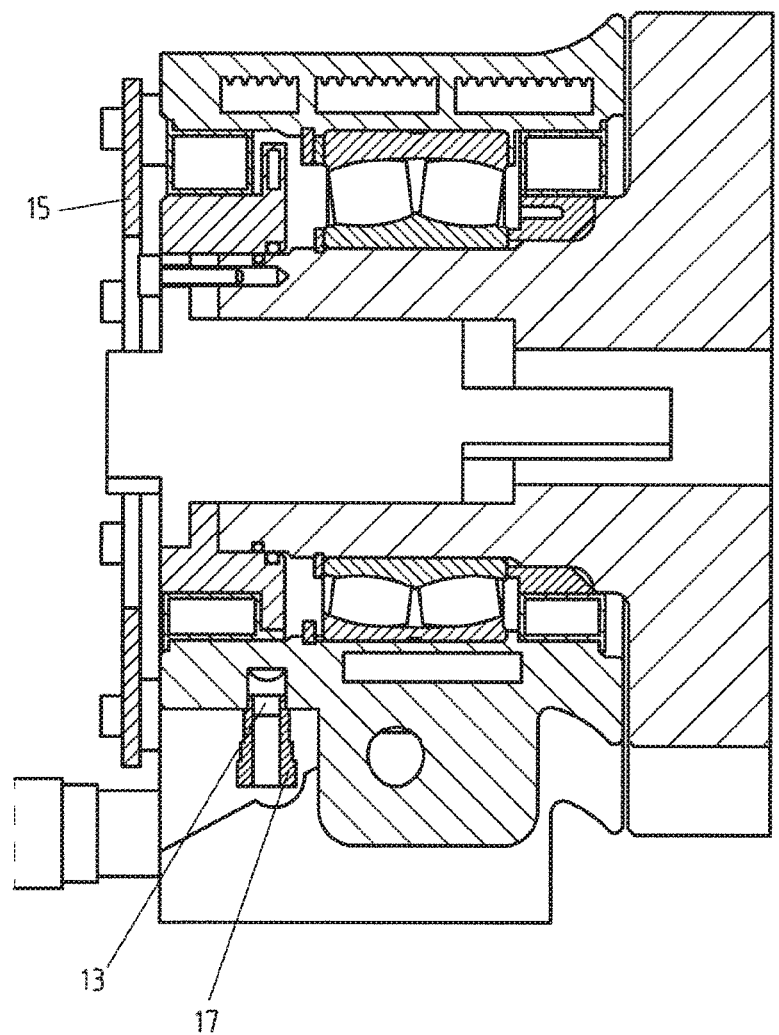
FIG. 4 shows a broken-off vertical section through the bearing block.

To detect the rotational speed of the roller and thus to monitor the rotational functionality of the bearing, the bearing block 1 comprises a Hall sensor 13, as shown in FIG. 4. It can be seen in FIG. 4 that this Hall sensor 13 is mounted in a blind hole in the outside surface of the bearing block 1. As can be seen in FIG. 1, magnets 11 are assigned to this Hall sensor; by means of magnet mounts 12, these magnets are permanently installed on the neck of the roller 2 and rotate along with the neck. When the roller 2 rotates, the Hall sensor 13 detects the changing magnetic field generated by the magnets co-rotating with the roller neck. In particular, the Hall sensor detects whether a magnet is rotating past it or not. The Hall sensor generates a corresponding measurement signal. From this measurement signal, it is then possible, under consideration of the number of magnets 11 distributed around the circumference of the roller neck, to calculate the rotational speed of the roller 2.

FIG. 1 also shows a coupling 17 for a corrugated hose, through which the cables of the Hall sensor 13 and the cables of the thermocouples can be guided. Finally, the reference number 22 designates a seal between the magnet mount 12 and the bearing neck 2a of the roller 2.

Figure 2:
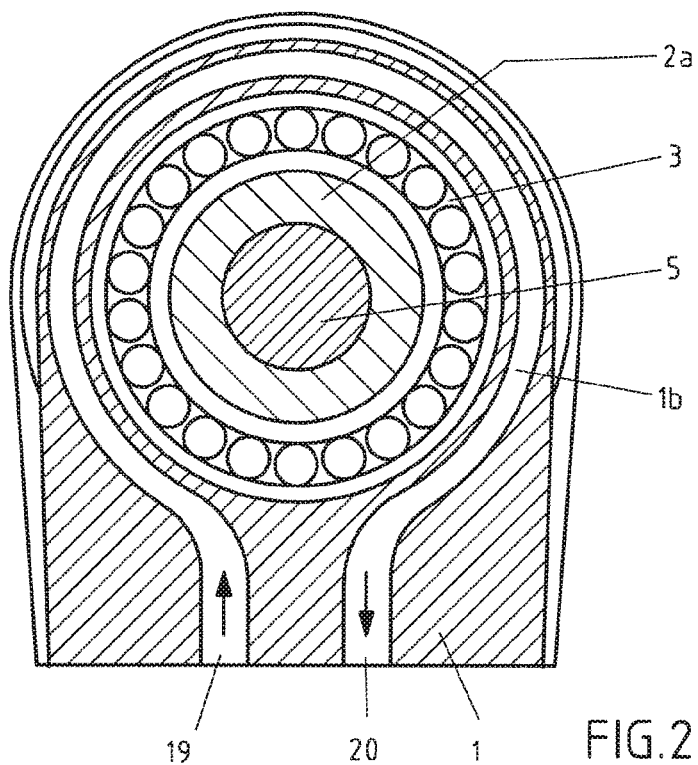
FIG. 2 shows a second vertical section through the bearing block according to the invention transversely to the longitudinal axis of the supported roller.

FIG. 2 shows the previously mentioned vertical section through the bearing block according to the invention, wherein this vertical section lies in a plane perpendicular to the longitudinal axis of the roller to be supported. The bearing block 1 and the coolant channel 1b formed in the bearing block can be seen. The coolant channel has a coolant inlet 19 and a coolant outlet 20. It can be seen that the coolant channel extends around the supported bearing, in particular around the roller bearing 3, over a very large portion of its circumference. The bearing neck 2a of the roller 2 and the rotary union 5 can be seen in the interior of the roller bearing—housed within in and coaxial to it.

Figure 3:
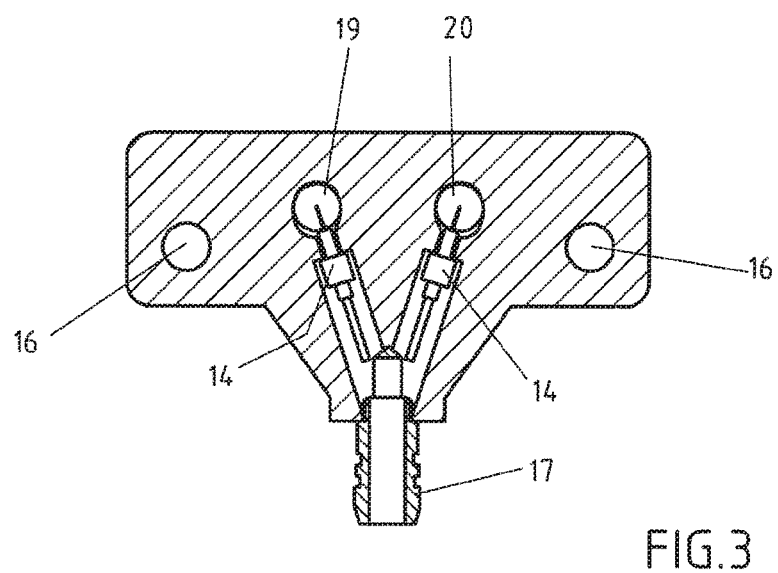
FIG. 3 shows a horizontal section through the bearing block according to the invention.

FIG. 3 shows a horizontal section through the bearing block 1, in particular through the inlet 19 and the outlet 20 of the coolant channel 1b shown in FIG. 2. It is easy to recognize a first and a second thermocouple 14, which project radially into the inlet 19 and the outlet 20 to measure the coolant inlet temperature and the coolant outlet temperature. They are configured as screw-in thermocouples and are screwed into appropriate bores in the circumference of the inlet 19 and outlet 20. Their measuring cables are conducted to the outside through the corrugated hose and the previously mentioned coupling 17. Also shown in FIG. 3 are two mounting bores 16 for the mounting of the bearing block 1.

LIST OF REFERENCE NUMBERS 1 bearing block with
1a dirt hump
1b coolant channel
2 roller
2a bearing neck of the roller
3 roller bearing
5 rotary union
6 cartridge seal
7 spacer ring
8 spacer ring
9 locking ring
10 locking ring
11 magnet
12 magnet mount
13 Hall sensor
14 screw-in thermocouples
15 cover plate
16 mounting bore
17 coupling for corrugated hose
18 sealing ring
19 water inlet
20 water outlet
21 stabilizing rib
22 sealing ring

The invention claimed is:

1. A bearing block for holding a bearing for a roller in a strand-guiding device, comprising:
   at least one integrated coolant channel with an inlet and an outlet for coolant, wherein the bearing block with the integrated interior coolant channel is configured as a solid casting;
   a rotational speed sensor for detecting rotational speed of the roller; and
   temperature sensors for detecting temperature of the coolant in the coolant channel, wherein
   the temperature sensors are configured as thermocouples, including a first thermocouple provided in the inlet to detect the coolant inlet temperature, and a second thermocouple provided in the outlet of the coolant channel to detect the coolant outlet temperature.

2. The bearing block according to claim 1, wherein the rotational speed sensor is a Hall sensor.

3. The bearing block according to claim 2, further comprising a plurality of magnets fastened to a neck of the roller to cooperate with the Hall sensor.

4. The bearing block according to claim 2, further comprising corrugated hoses for signal cables of the thermocouples and of the Hall sensor, wherein the corrugated hoses are attached to the bearing block by couplings.

5. The bearing block according to claim 1, further comprising a blind hole introduced externally into the bearing block, the rotational speed sensor being mounted in the blind hole.

6. The bearing block according to claim 1, wherein the thermocouples are screw-in thermocouples that are screwed into bores, one in the inlet and one in the outlet, of the coolant channel.

7. The bearing block according to claim 1, further comprising at least one stabilizing rib in the coolant channel.

8. The bearing block according to claim 1, the bearing block is cast from a hardened stainless chromium-nickel-copper steel.

9. The bearing block according to claim 1, wherein the bearing is a sealed roller bearing.

10. A strand-guiding device of a strand-casting machine, comprising:
- a plurality of strand-guiding rollers for guiding a cast strand after the cast strand has left a strand-casting mold;
- a bearing block according to claim 1, wherein at least one neck of one of the strand-guiding rollers is supported in the bearing block; and
- a process control system for automatically controlling a feed quantity of the coolant based on an actual cooling action of the bearing block, wherein the actual cooling action is determined based on temperature of the coolant at the inlet and in the outlet of the coolant channel as detected by the temperature sensors.

11. The bearing block according to claim 1, wherein the roller is a strand-guiding roller in a strand-guiding device.

* * * * *